Patented May 4, 1937

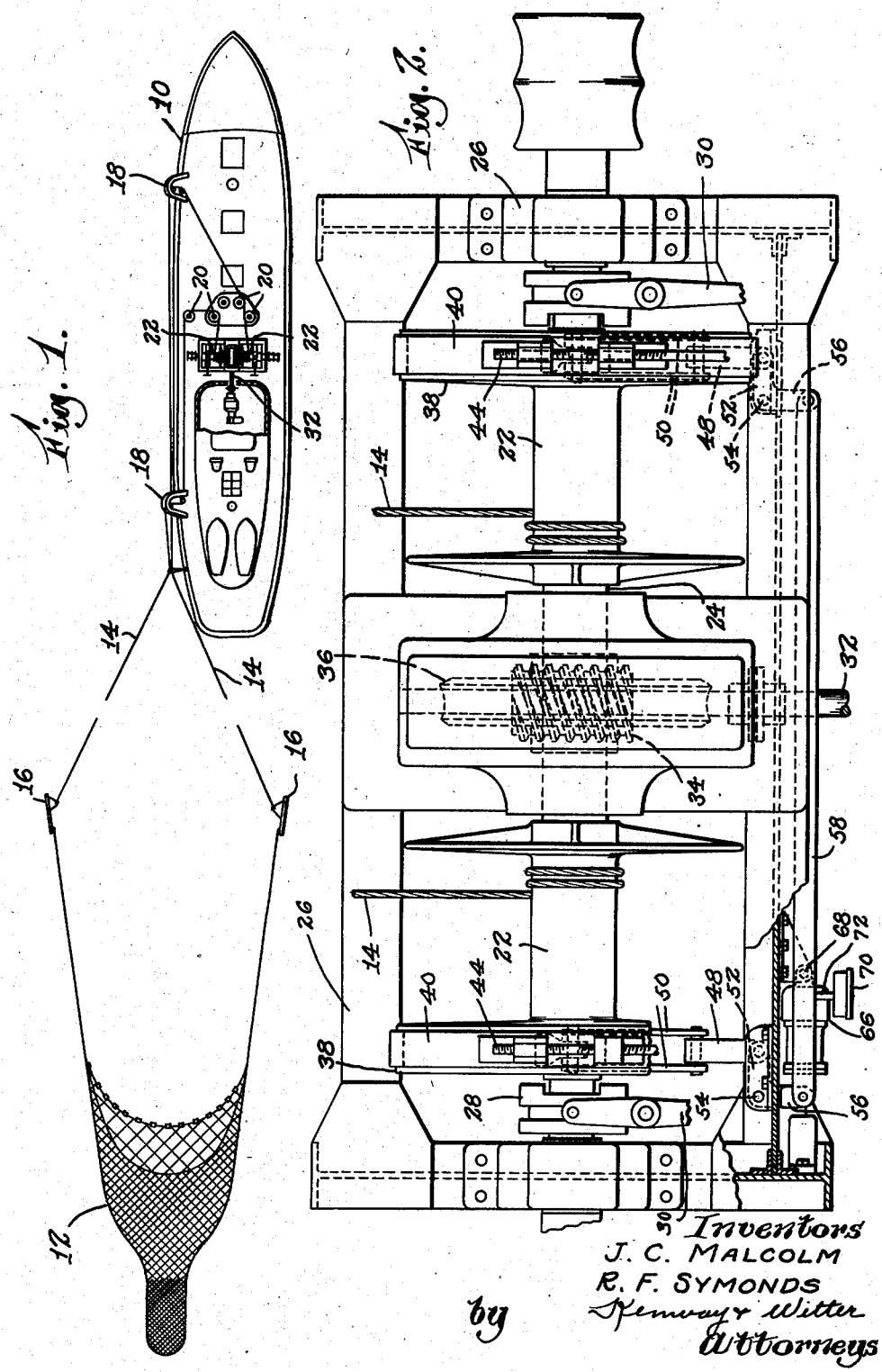

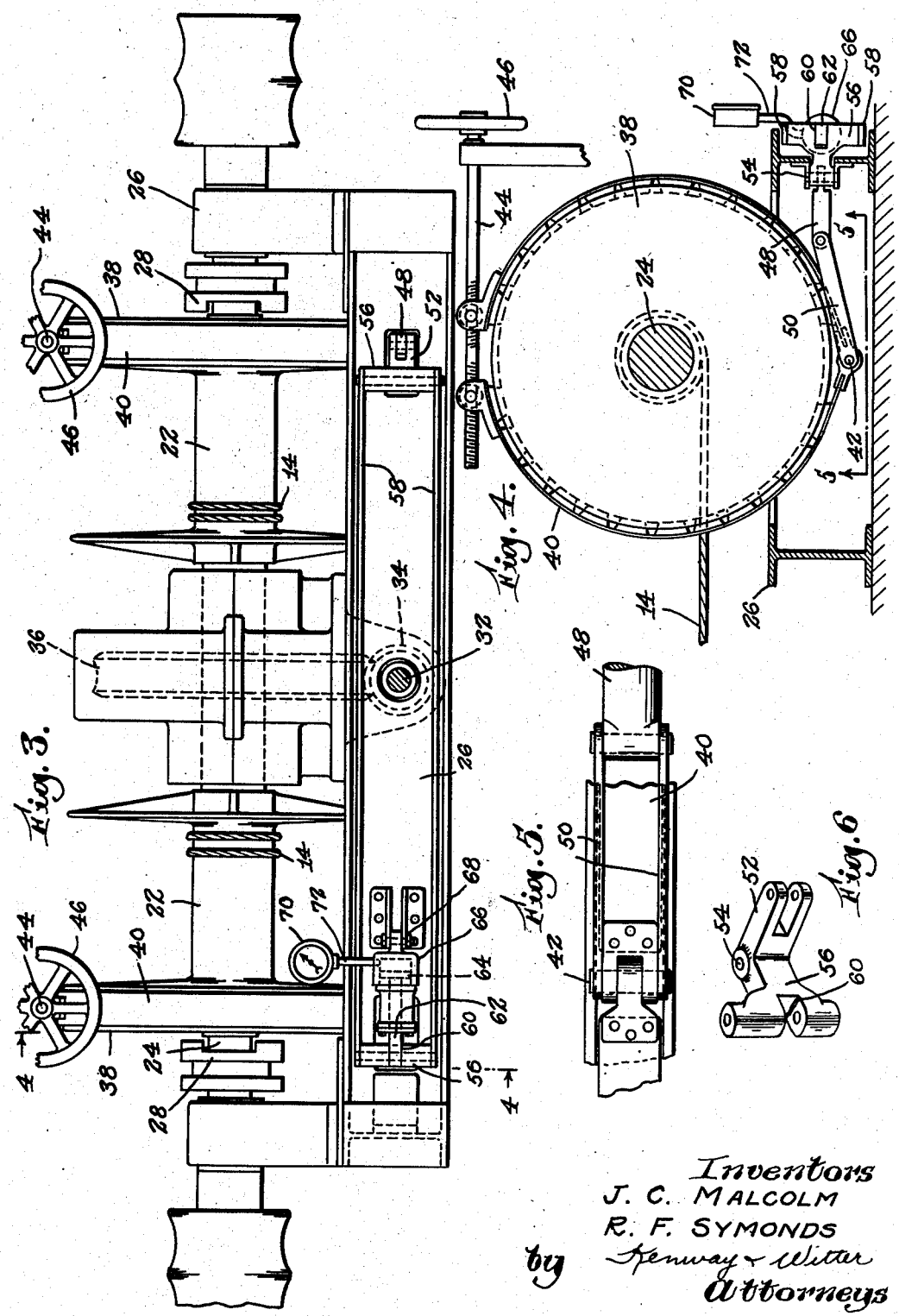

2,079,021

UNITED STATES PATENT OFFICE 2,079,021

INDICATING MECHANISM FOR TRAWLING

John C. Malcolm, Quincy, and Ralph F. Symonds, Marblehead, Mass.

Application March 19, 1936, Serial No. 69,680

8 Claims. (Cl. 265—1)

This invention relates to trawls and more especially to fishing trawls. In deep sea fishing as at present practised, the trawl net is dragged behind the trawling boat for a predetermined period of time, usually upwards of two hours, before the net and fish therein are hauled aboard. The approximate time and place of the catch is then determined by the condition of the fish, viz. lively or dead. Thus the fish may have been caught during the early part of the tow in which case not only was the remaining portion of the tow wasted time and effort, but also the fish are in poorer condition than they would have been had the haul been made earlier. Furthermore, the determining of the time and place factors of the catch are so approximate that opportunity for succeeding and repeated catches are usually lost. The primary object of our invention resides in the provision of an indicating mechanism for trawls which will at all times show the pull on the trawl or net cables and thereby instantly indicate both the time and place of the catch.

The trawling mechanism includes a winch having a drum onto which the trawl cables are wound and by which the net is hauled. In accordance with our invention we provide means cooperating with this drum portion for indicating the degree of pull thereon by the cables. We have herein illustrated and described hydraulic means embodying a piston and cylinder for performing this function, the piston being connected to a brake drum portion of the cable drum by a brake band in turn so connected to the piston as to transmit thereto and to the liquid in the cylinder the rotative torque on the brake band. A gauge in communication with the cylinder at all times indicates the pressure of the liquid therein which pressure corresponds to the torque pull on the brake band.

We have herein illustrated and may prefer to use a winch of the double drum type having a single drive located between the two drums, the two cables from the opposite sides of the trawl being respectively attached to the two drums. The drive is preferably through worm gearing, and clutches may be provided for releasing the drums from the driver. One of the drums is connected to the said piston through a brake band and suitable connections, and another feature of the invention resides in suitable connections from the other drum to the first named connections or to the piston whereby the combined pull of the two cables on their drums is transmitted to the piston and registered on the liquid pressure gauge.

It will be apparent that mechanism of the above defined nature at all times indicates the pull on the trawl cables and thus shows the operator when and where the catch is made. The operator may thereupon immediately haul the net while the fish are fresh and lively, and thereafter immediately proceed to retow the net back through the same location and make another like catch. The invention therefore, as applied to fishing (1) saves time, (2) results in fresh and lively catches, (3) permits repeated catches in the same schools or locations, (4) prevents hauling in the net when no fish have been caught, and (5) generally renders fishing operations more economical and efficient. The production of mechanism of the above defined nature, for towing or sweeping operations, wherever the same is found useful, comprises an object of invention.

These and other features of the invention will be best understood and appreciated from a description of a preferred embodiment thereof selected for purposes of illustration and shown in the accompanying drawings, in which, Fig. 1 is a plan view of a boat and net showing the application of our invention to the fishing industry, Fig. 2 is an enlarged plan view of a winch embodying a part of our invention, Fig. 3 is a front view of the winch, Fig. 4 is a sectional view taken on the line 4—4 of Fig. 3, Fig. 5 is a fragmentary view taken on the line 5—5 of Fig. 4, Fig. 6 is a perspective view of a bell crank.

In the drawings, 10 indicates a boat and 12 a trawl or net being towed thereby. Two cables 14 attached to trawl doors 16 for keeping the net in spread condition extend around gallows frames 18, over pulleys 20 and respectively onto two drums 22 of a double drum winch. The drums are loosely mounted on a shaft 24 rotatable within the frame 26 of the winch. The drums may be connected to and disconnected from the shaft by clutches 28 adapted to be shifted by levers 30. The shaft is driven by a motor from a transverse shaft 32 having a worm 34 thereon in mesh with a worm wheel 36 fixed to the shaft 24 between the drums.

At the outer end of each drum is a relatively large brake drum portion 38 and surrounding each such brake drum portion is a brake band 40 comprising two parts pivoted together at their lower ends 42 and connected together at their upper ends by an oppositely threaded screw shaft 44. Rotation of a hand wheel 46 on each shaft in one direction is adapted to bind the band onto the drum and rotation thereof in the opposite direction is adapted to release the band therefrom. Connecting the pivot 42 of each band to one end of a link 48 are a pair of links 50, the link 48 having its other end connected to one arm 52 of a bell crank pivoted at 54. The other arms 56 of the two bell cranks are connected together by two relatively long links 58.

One of the bell crank arms 56 is slotted at 60 and connected to such arm within this slot is a piston rod 62 carrying a piston 64 operating within a cylinder 66, the cylinder being fixed to the winch frame at 68. The cylinder chamber is adapted to hold a suitable liquid to be compressed by the piston, and a gauge 70 in communication with the chamber through a pipe 72 is adapted to indicate the liquid pressure.

The operation of the mechanism is as follows: When the net has been let out to the position illustrated in Fig. 1, the brake bands 40 are closed onto their drums 38 and the clutches 28 are disengaged, leaving the drums 22 free on the shaft 24 but held from rotation by the brake bands. The trawl pull on the cables, as the trawl is towed behind the boat, is in a direction moving the piston 64 inwardly of its cylinder 66 (to the right in Fig. 3), the brake bands of the two drums being connected together and to the piston by the long links 58. Thus the pull of the trawl is directly resisted by the liquid in the cylinder and the pressure of this liquid, as indicated by the gauge 70, at all times shows the towing pull. When a catch has been made sufficient to warrant hauling in the net, the clutches are closed and the brake bands released. The winch is then operated in the usual manner to make the haul. Thus it will be seen that the invention provides means for indicating the time and place of the catch, thereby saving time, permitting repeated catches, providing for hauling the fish in while they are alive and in good condition, and eliminating useless hauling of the net when insufficient catch has been made.

Having thus described our invention, what we claim as new and desire to secure by Letters Patent of the United States is,

1. In an indicating mechanism for trawls, a winch, trawl cables attached to the rotary drum portion thereof, power means for rotating the drum, means to disconnect the power means from the drum, means to prevent rotation of the drum with the power means disconnected and a load on the cables, and means cooperating with the winch for indicating the degree of pull thereon by the cables when the power means is disconnected from the drum.

2. In an indicating mechanism for trawls, a winch, trawl cables attached to the rotary drum portion thereof, power means for rotating the drum, means to disconnect the power means from the drum, means to prevent rotation of the drum with the power means disconnected and a load on the cables, and means cooperating with said drum portion for indicating the rotary torque thereon by the cables when the power means is disconnected from the drum.

3. In an indicating mechanism for trawls, a winch, trawl cables attached to the rotary drum portion thereof, power means for rotating the drum, means to disconnect the power means from the drum, means to prevent rotation of the drum with the power means disconnected and a load on the cables, means providing an hydraulic chamber, means for transmitting the pull on the drum portion by the cable to the liquid within the chamber when the power means is disconnected from the drum, and a gauge cooperating with the chamber for indicating the liquid pressure therein.

4. In an indicating mechanism for trawls, a winch, trawl cables attached to the rotary drum portion thereof, brake drum means carried by said drum portion, brake band means surrounding and cooperating with the brake drum means for preventing rotation thereof, means for controlling the application and release of the brake band means, and means including a gauge cooperating with the brake band means for indicating the braking torque thereon.

5. In an indicating mechanism for trawls, a winch having a rotary drum, a trawl cable attached to the drum, a brake band cooperating with a brake drum portion of the drum for preventing substantial rotation thereof, a cylinder, a piston within the cylinder, connection from the brake band to the piston whereby rotative torque on the band is transmitted to the piston, and a gauge cooperating with the cylinder for indicating the liquid pressure therein.

6. In an indicating mechanism for trawls, a winch having two rotary drums, two trawl cables respectively attached to the drums, and means including a gauge cooperating with one of the drums and a connection from the other drum to said means whereby the combined pull of the two cables on their drums is indicated by the gauge.

7. In an indicating mechanism for trawls, a winch having two rotary drums, two trawl cables respectively attached to the drums, a cylinder, a piston within the cylinder, means for transmitting to the piston the torque pull of one of the cables on its drum, means providing a connection from the other drum to the first named means whereby the combined pull of the two cables on their drums is transmitted to the piston, and a gauge cooperating with the cylinder for indicating the liquid pressure therein.

8. In an indicating mechanism for trawls, a winch having two rotary drums, a driver therefor including a gear wheel therebetween and releasable clutch connections to the drums, a driving member in mesh with the gear wheel, two trawl cables respectively attached to the drums, and means including a gauge cooperating with both drums for indicating the combined pull of the two cables on the drums.

JOHN C. MALCOLM.
RALPH F. SYMONDS.